United States Patent
Negishi et al.

(10) Patent No.: US 6,886,935 B2
(45) Date of Patent: May 3, 2005

(54) NOSE PAD ASSEMBLY FOR AN EYEGLASS FRAME

(75) Inventors: Tohru Negishi, 204-2, Bonsai-cho, Kita-ku, Saitama-shi, Saitama-ken (JP); Masatoshi Saitoh, Saitama-ken (JP)

(73) Assignee: Tohru Negishi, Saitama (JP)

( * ) Notice: Subject to any disclaimer, the term of this patent is extended or adjusted under 35 U.S.C. 154(b) by 0 days.

(21) Appl. No.: 10/932,065

(22) Filed: Sep. 2, 2004

(65) Prior Publication Data

US 2005/0052614 A1 Mar. 10, 2005

(51) Int. Cl.⁷ .................................................. G02C 5/12
(52) U.S. Cl. ........................................ 351/137; 351/55
(58) Field of Search ................................ 351/137, 136, 351/138, 55, 54, 41

(56) References Cited

U.S. PATENT DOCUMENTS

| | | |
|---|---|---|
| 2,986,971 A | 6/1961 | Jent |
| 4,280,758 A | 7/1981 | Flader |
| 5,691,796 A | 11/1997 | Negishi |
| 6,056,398 A * | 5/2000 | Negishi ...................... 351/55 |

FOREIGN PATENT DOCUMENTS

| | | |
|---|---|---|
| EP | 0 936 488 A1 | 8/1999 |
| EP | 1 168 036 A1 | 1/2002 |

* cited by examiner

Primary Examiner—Hung Xuan Dang
(74) Attorney, Agent, or Firm—Harness, Dickey & Pierce, P.L.C.

(57) ABSTRACT

A nose pad assembly is slidably mounted to an eyeglass frame by which a pair of multifocal lenses are held. The nose pad assembly includes a pair of oval nose pads within which elongated guide grooves are defined. Two pairs of upper and lower magnets are coaxially and fixedly mounted in the upper and lower ends of the respective nose pads. A pair of slides are slidably moved along the guide grooves and attached to a pair of pad arms of the eyeglass frame. The slides include a corresponding pair of slide magnets positioned within the respective guide grooves. The slide magnets are selectively attracted to the upper and lower magnets to hold the eyeglass frame in its upper and lower positions, respectively. A bridge member extends between the upper end of the nose pads. The bridge member is configured to resist a substantially vertical force which may be applied thereto when the eyeglass frame is moved between its upper and lower positions. The bridge member is free to flex in a substantially horizontal direction so that orientation of the nose pads can readily be adjusted.

17 Claims, 6 Drawing Sheets

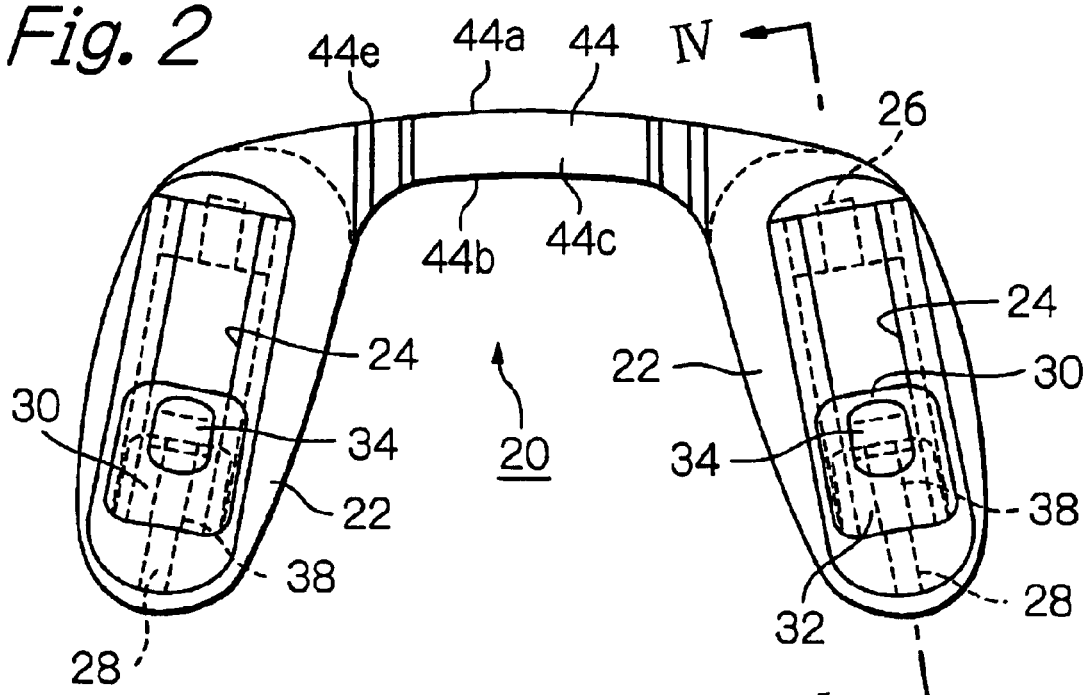
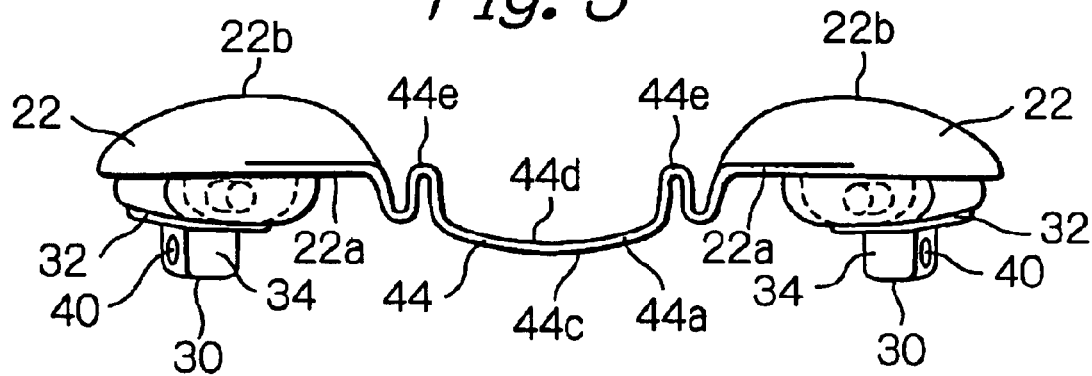
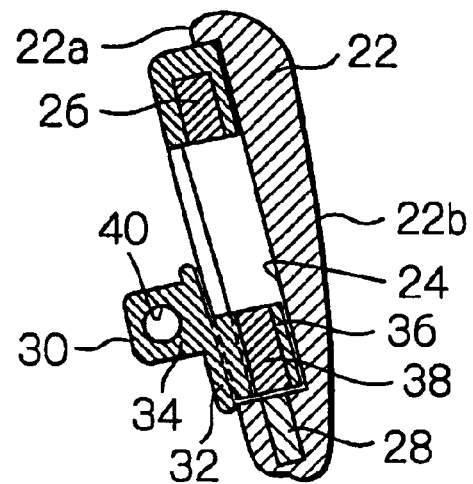

NOSE PAD ASSEMBLY FOR AN EYEGLASS FRAME

BACKGROUND OF THE INVENTION

The present invention generally relates to eyeglass frames and more particularly, to a nose pad assembly suitable for use in an eyeglass frame with multifocal lenses.

Various attempts have been made to raise or lower bifocal or other multifocal eyeglass lenses before the eyes of a wearer so that two or more different focal fields of the lenses can be moved into and out of the desired position of use.

U.S. Pat. No. 5,691,796 issued to Negishi discloses en eyeglass frame with bifocal lenses. A pair of separate nose pads are slidably mounted to a corresponding pair of pad arms of the eyeglass frame and include respective guide grooves. Upper and lower fixed magnets are mounted in the upper and lower ends of the nose pads. A pair of slides are slidably moved along the respective guide grooves and include slide magnets. The slides magnets are selectively attached to the upper and lower magnets to securely hold the eyeglass frame in its upper and lower positions. In such an arrangement, one of the slide magnets is, sometimes, accidentally kept in magnetic contact with the lower magnet when the eyeglass frame is lifted from its lower position to place the reading segment of the bifocal lenses before the eyes of a wearer. If this occurs, a corresponding one of the nose pads is undesirably displaced upwardly along the nose of the wearer. Also, undue friction which may be produced when one of the slides is moved along the guide groove results in undesirable displacement of the nose pad. In Negishi patent, a pad bridge is employed to connect the nose pads together. The pad bridge is vertically arcuate and is in the form of a string with a circular section. Such a string-like bridge can not securely hold the nose pads on the nose of the wearer as it is not capable of resisting a vertical force which may be developed when the eyeglass frame is moved in a vertical direction.

Accordingly, it is an object of the present invention to provide a nose pad assembly which can securely hold a pair of nose pads on the nose of a wearer when an eyeglass frame is moved in a vertical direction and allows the nose pads to be freely adjusted to any desired position during fitting of the eyeglass frame.

SUMMARY OF THE INVENTION

According to the present invention, there is provided a nose pad assembly adapted for use in an eyeglass frame with multifocal lenses. An existing eyeglass frame typically includes a pair of lens supporting members interconnected by a bridge and adapted to hold a pair of lenses, a pair of temples hingedly supported on the respective lens supporting members, and a pair of pad arms extending from the nasal side of the lens supporting members. Advantageously, the nose pad assembly of the present invention can be slidably mounted to the pad arms of such an existing eyeglass frame. The nose pad assembly includes a pair of nose pads, means operatively associated with the nose pads for holding the eyeglass frame in its upper and lower positions. A bridge member extends between the nose pads. The bridge member is configured to resist a substantially vertical force while being free to flex in a substantially horizontal direction.

In one embodiment, the nose pads include respective elongated guide grooves extending between the upper and lower ends of the nose pads. Means for holding the eyeglass frame includes a pair of upper magnets fixedly mounted in the upper end of the nose pads, a pair of lower magnets fixedly mounted in the lower end of the nose pads, and a pair of slides slidably moved along the guide grooves of the nose pads and adapted to be detachably secured to the respective pad arms. The slides include a pair of slide magnets positioned within the respective guide grooves and selectively attached to the upper and lower magnets to hold the eyeglass frame in its upper and lower positions, respectively. If, for example, one of the slide magnets is accidentally kept in magnetic contact with a corresponding one of the lower magnets when the eyeglass frame is moved from its lower to upper position, a corresponding one of the nose pads can undesirably be displaced upwardly along the nose of a wearer. If displaced, an upward force will be exerted on the bridge member. The bridge member effectively resists such an upward force and thus, allows the slide magnet to be separated from the lower magnet so that the eyeglass frame is smoothly moved to its upper position. At the time the eyeglass frame is fitted, the nose pads need to be properly adjusted to the contour of the nose of a wearer. Although the nose pads are interconnected by the bridge member, the bridge member, due to its shape and orientation, is flexed or bent in a horizontal direction to allow such adjustment.

In one embodiment, the thin bridge member is elongated in a horizontal direction and oriented in an upright position between the nose pads. The bridge member has a horizontally arcuate shape so as not to interfere with the nose of a wearer. The bridge member may have opposite curved or wavy ends. In one embodiment, the curved ends of the bridge member have a S-shape. This arrangement allows rocking of the nose pads in most directions and facilitates adjustment of the nose pads.

The two nose pads and the bridge member may be of a one-piece construction. Alternatively, the bridge member may be a separate or discrete piece and has opposite ends secured to the nose pads. A single horizontal pin may be employed to secure the bridge member to each of the nose pads. In such a case, the angular position of the nose pads can be varied by rotating the nose pads about the respective horizontal pins. The bridge member may also have elongated slots at its opposite ends. A pair of horizontal pins or screws may be passed through the respective elongated slots and inserted or threaded into the nose pads to secure the bridge member in position. The distance between the two nose pads can be varied by displacing the pins or screws along the elongated slots. The bridge member may have stoppers to limit the range of angular movement of the nose pads.

In one embodiment, a pair of holders are secured to the nose pads. The holders are configured to support the bridge member in such a manner that the bridge member is rotatable in a substantially horizontal direction. The bridge member is made, for example, of a rigid plastic material or metal although not limited thereto. The bridge member thus resists a vertical force which may be applied thereto, for example, when the eyeglass frame is moved between its upper and lower positions.

BRIEF DESCRIPTION OF THE DRAWINGS

The above and other objects and advantages of the present invention will become more apparent from the following detailed description when taken in conjunction with the accompanying drawings, in which:

FIG. 2 is front view of the nose pad assembly shown in FIG. 1;

FIG. 3 is a top plan view of the nose pad assembly;

FIG. 4 is a sectional view taken on the line IV—IV in FIG. 2;

DETAILED DESCRIPTION OF THE INVENTION

Figure 1:
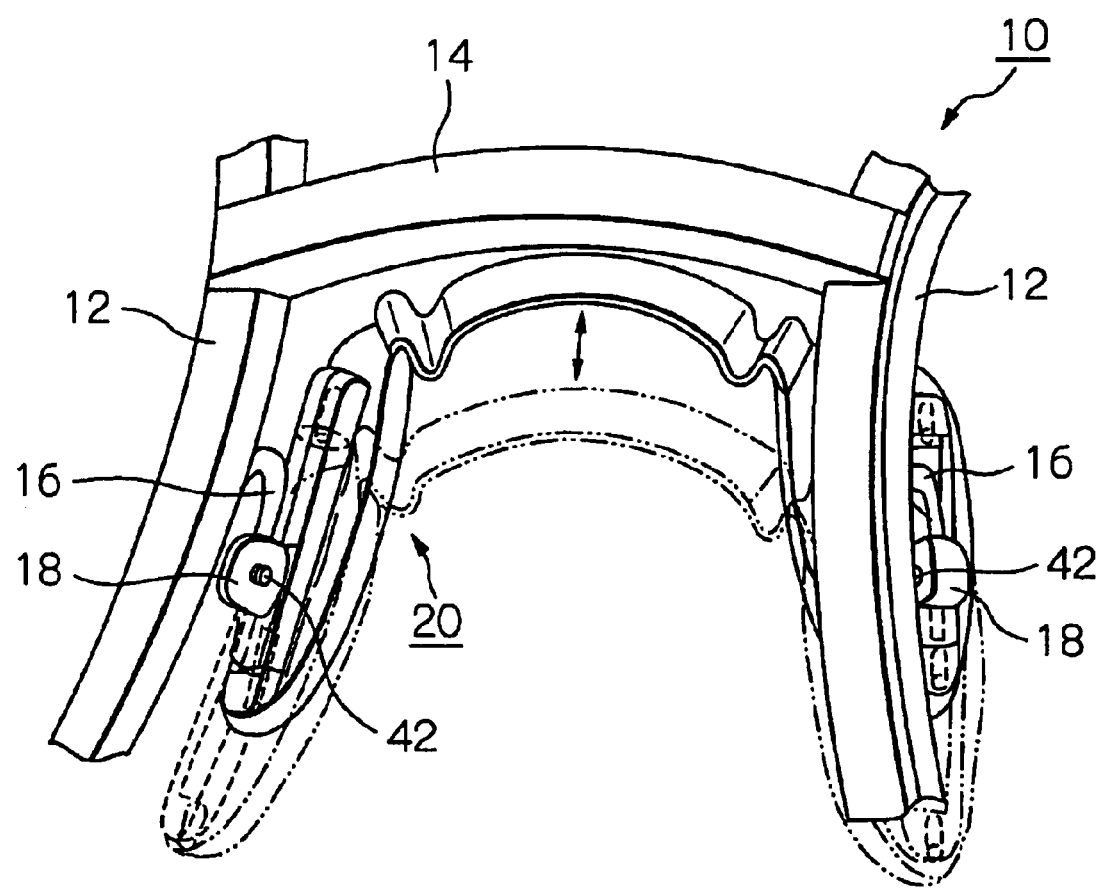
FIG. 1 is a front perspective view of a nose pad assembly made according to one embodiment of the present invention and slidably mounted to an existing eyeglass frame.

Throughout the following description and drawings, an identical reference number is used to refer to the same components shown in multiple figures of the drawing.

Referring now to FIG. 1, there is shown an eyeglass frame 10 which includes a pair of rims 12 interconnected by a bridge 14 and shaped to hold, for example, a pair of bifocal lenses (not shown). Although not shown, a pair of temples are hingedly supported on the rims 12. A pair of pad arms 16 extend from the nasal side of the rims 12. A post receptacle box 18 is secured to the free end of the pad arm 16 and has a threaded aperture (not shown) as will later be described. According to the present invention, a nose pad assembly 20 is slidably mounted to the pad arms 16, 16.

Referring to FIGS. 2 to 4, the nose pad assembly 20 includes a pair of spaced nose pads 22, 22 adapted to rest against opposite sides of the nose of a wearer. It will be understood that one is a mirror image of the other. The nose pad 22 is generally oval in shape and has a front side 22a and a slightly round rear or nasal side 22b. An elongated guide groove 24 is defined within the nose pad 22 and extends between the upper and lower ends of the nose pad 22. Cylindrical upper and lower magnets 26, 28 are coaxially and fixedly mounted within the upper and lower ends of the nose pad 22, respectively. A slide 30 includes a rectangular base 32, a rectangular post 34 integrally connected to the top surface of the base 32, and a cylindrical sleeve 36 integrally connected to the bottom surface of the base 32 and positioned within the guide groove 24. A cylindrical magnet 38 is fittingly inserted through the cylindrical sleeve 36 so that the magnet 38 is coaxial with the magnets 26, 28. The magnet 38 is selectively attached to the upper and lower magnets 26, 28 to securely hold the eyeglass frame 10 in its upper and lower positions. The diameter of the sleeve 36 is greater than the width of the guide groove 24 so that the sleeve 36 is securely held within the guide groove 24. The rectangular post 34 has an aperture 40. The post 34 is inserted into the post receptacle box 18 of the pad arm 16 until the aperture 40 is aligned with the threaded aperture of the post receptacle box 18. A screw 42 (see FIG. 1) is then threaded through the threaded aperture and the aperture 40 to secure the nose pad 22 in place.

A thin bridge member 44 extends between the upper end of the nose pads 22, 22. In the embodiment shown in FIGS. 2 to 4, the bridge member 44 is unitarily formed with the nose pads 22, 22. The bridge member 44 is elongated in a horizontal direction and is placed in an upright position between the nose pads 22, 22. As shown best in FIG. 3, the bridge member 44 has top and bottom surfaces 44a, 44b and vertical front and rear surfaces 44c, 44d. The width or thickness of the top and bottom surfaces 44a, 44b of the bridge member 44 is substantially less than the width of the front and rear surfaces 44c, 44d. This configuration allows the bridge member 44 to resist a substantially vertical force which may be applied to the bridge member 44 when the eyeglass frame 10 is moved between its upper and lower positions. If, for example, one of the right and left magnets 38, 38 is accidentally kept in magnetic contact with a corresponding one 28 of the magnets when the eyeglass frame 10 is moved from its lower to upper position, a corresponding one 22 of the nose pads can undesirably be displaced upwardly along the nose of a wearer. If displaced, an upward force will be exerted on the bridge member 44. The bridge member 44, due to its shape and orientation, resists such an upward force and thus, allows the magnet 38 to be separated from the magnet 28 so that the eyeglass frame 10 is smoothly moved to its intended position. It should be understood that the bridge member 44, also due to its shape and orientation, is free to flex in a substantially horizontal direction. Additionally, the bridge member 44 have opposite curved ends 44e. Illustratively, the curved ends 44e of the bridge member 44 have a S-shape although they may take any other forms. This configuration allows the nose pads 22, 22 to be easily adjusted to the contour of the nose of a wearer, regardless of the fact that the two nose pads 22, 22 are interconnected by the bridge member 44.

Figure 5:
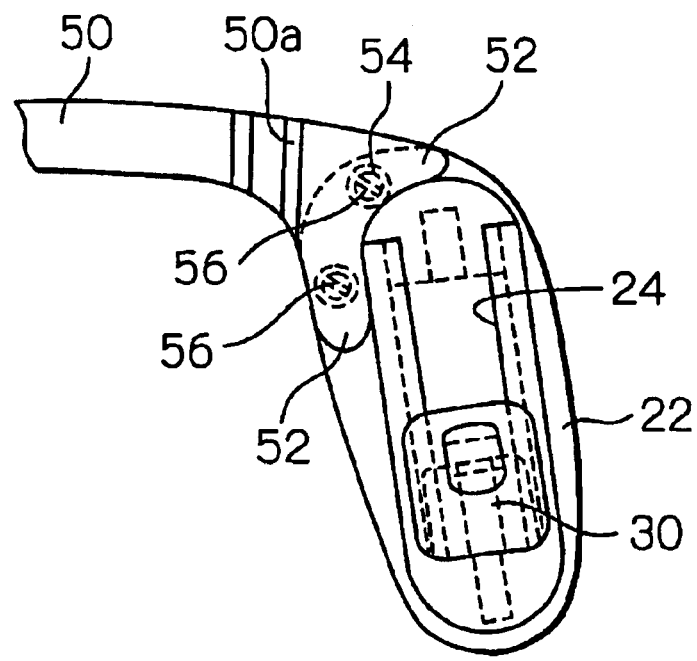
FIGS. 5 and 6 are partial front views of modified forms of the nose pad assembly shown in FIGS. 1 to 4.

FIG. 5 partially shows an alternative form of the nose pad assembly according to the present invention. As shown, a discrete thin bridge member 50 extends between the two nose pads 22, 22 (only one is shown) and has opposite curved regions 50a, 50a (only one is shown) as in the previous embodiment. The bridge member 50 is bifurcated at each end to form two separate fingers 52, 52. Each of the fingers 52, 52 has a through opening 54. The nose pad 22 is formed at its upper end with two blind holes (not shown). After the through openings 54, 54 are aligned with the respective blind holes, two split pins 56, 56 are inserted through the respective openings 54, 54 and into the blind holes to secure the bridge member 50 to the nose pad 22. Alternatively, two screws 58 may be used to secure the bridge member 50 to the nose pad 22 as shown in FIG. 6.

Figure 7:
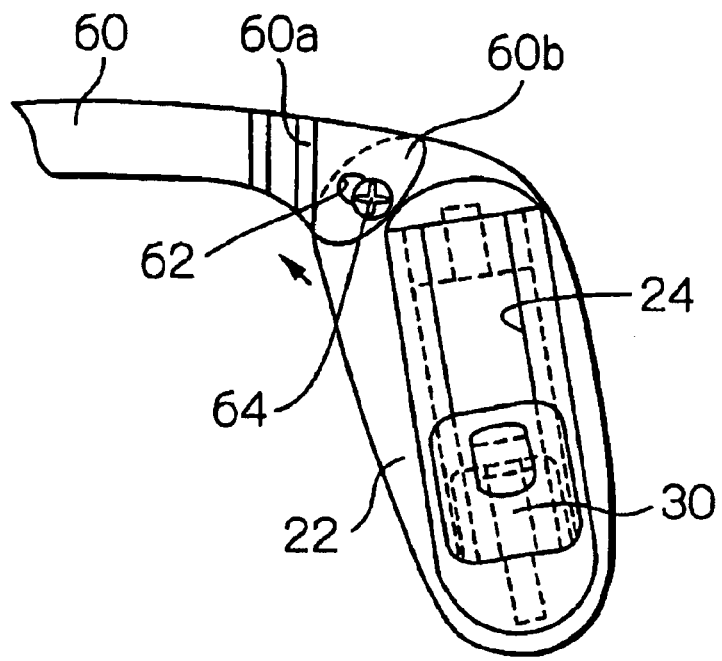
FIG. 7 is a partial front view of another form of the nose pad assembly wherein the angular position of and the distance between two nose pads are adjustable.

In the embodiment shown in FIG. 7, a discrete thin bridge member 60 extends between the two nose pads 22, 22 (only one is shown) and has opposite curved regions 60a, 60a (only one is shown). The bridge member 60 has opposite enlarged ends 60b, 60b (only one is shown). An elongated slot 62 is defined in each enlarged end 60b of the bridge member 60 and inclined slightly downwardly toward the nose pad 22. The nose pad 22 is formed with at its upper end with a blind hole (not shown). A screw 64 is inserted through the elongated opening 62 and into the blind hole. The distance between the two nose pads 22, 22 can be varied by moving the screws 64 along the elongated slot 62 as shown by the arrow in FIG. 7. Also, the angular position of the nose pad 22 can be varied by rotating the nose pads about the screws 64.

Figure 6:
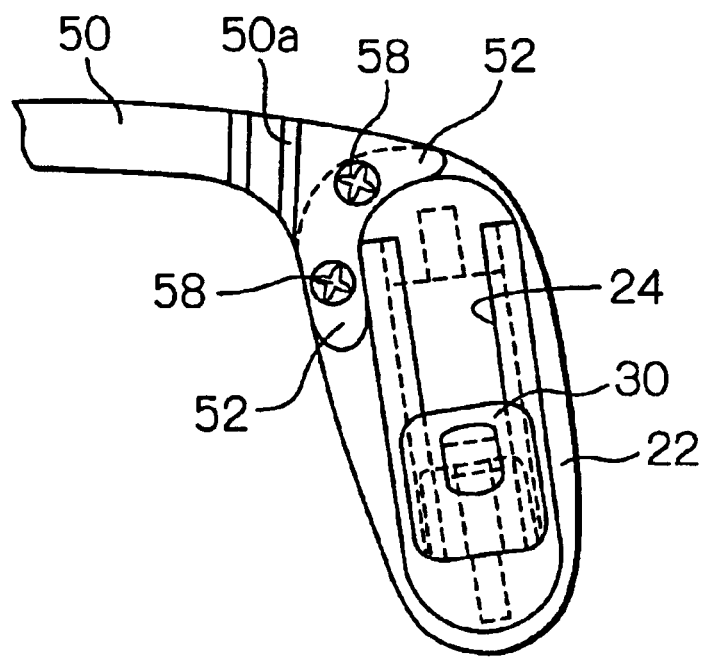
Figure 8:
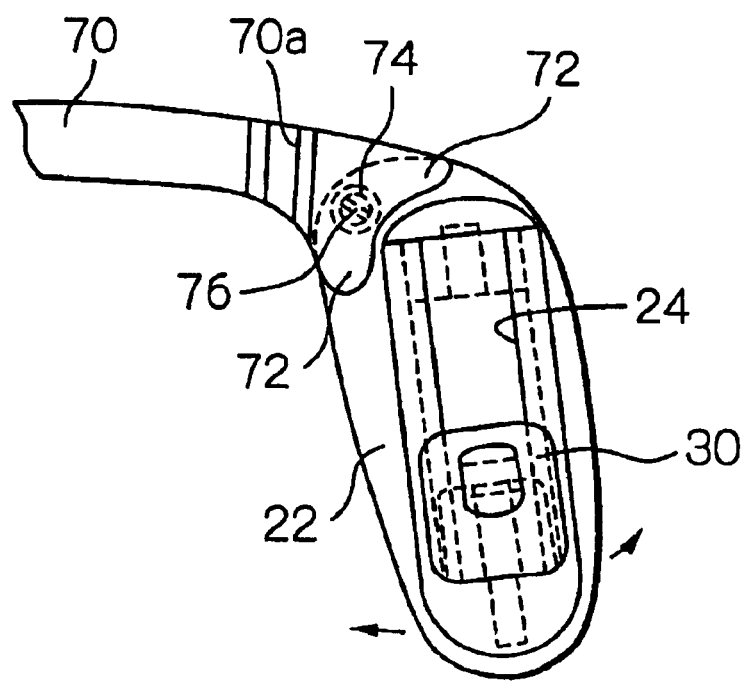
FIGS. 8 to 10 are partial front views of alternative forms of the nose pad assembly wherein the angular position of the nose pads is adjustable.

The embodiment shown in FIG. 8 is somewhat similar to the embodiments shown in FIGS. 5 and 6, but allows adjustment of the angular position of the nose pads 22, 22. Specifically, a discrete thin bridge member 70 extends between the two nose pads 22, 22 (only one is shown) and has opposite curved regions 70a, 70a (only one is shown)

adjacent to its opposite ends. The bridge member 70 is bifurcated at each end with two separate short fingers 72, 72. A through opening 74 is defined in near the common distal end of the two separate fingers 72, 72. The nose pad 22 is formed at its upper end with a blind hole (not shown). After the through opening 74 is aligned with the blind hole, a pin 76 is inserted through the opening 74 and into the blind hole to secure the bridge member 70 to the nose pad 22. The use of the single pin 76 allows the nose pad 22 to rotate about the pin 76 and thus, to be adjusted to any desired angular position, as shown by the arrows in FIG. 8.

Figure 9:
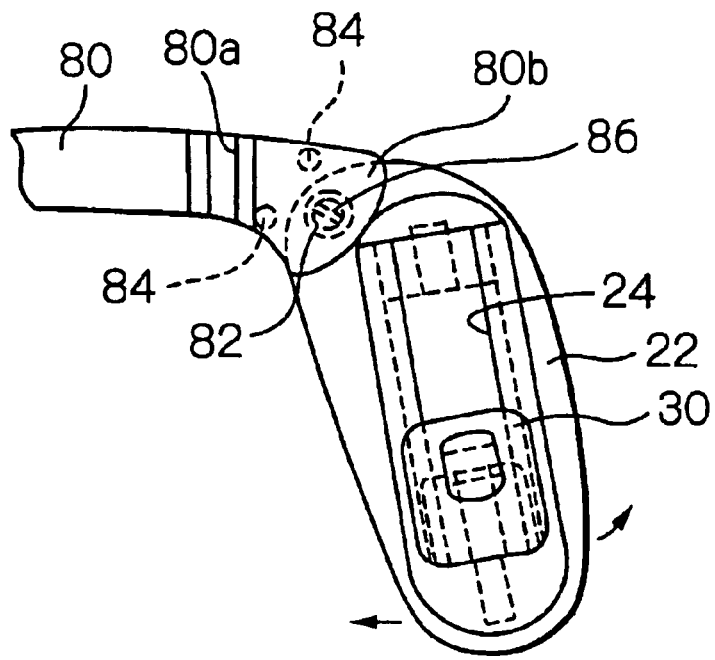

In the embodiment shown in FIG. 9, a discrete thin bridge member 80 extends between the two nose pads 22, 22 (only one is shown) and has opposite curved regions 80a, 80a (only one is shown). The bridge member 80 has opposite enlarged ends 80b, 80b (only one is shown). A through opening 82 is defined in each enlarged end 80b of the bridge member 80. Two spaced stoppers 84, 84, in the form of cylindrical pins, horizontally extend from the rear surface of the bridge member 80 adjacent to the top and bottom ends. The nose pad 22 is formed at its upper end with a blind hole (not shown). A pin 86 is inserted through the opening 82 and into the blind hole to secure the bridge member 80 to the nose pad 22. As in the embodiment shown in FIG. 8, the use of the single pin 86 allows the nose pad 22 to rotate about the pin 86 as shown by the arrows in FIG. 9. In this embodiment, however, the nose pad 22 can be rotated in clockwise and counterclockwise directions only until the upper end of the nose pad 22 is brought into contact with the respective stoppers 84, 84. The stoppers 84, 84 thus serve to limit the range of angular movement of the nose pad 22.

Figure 10:
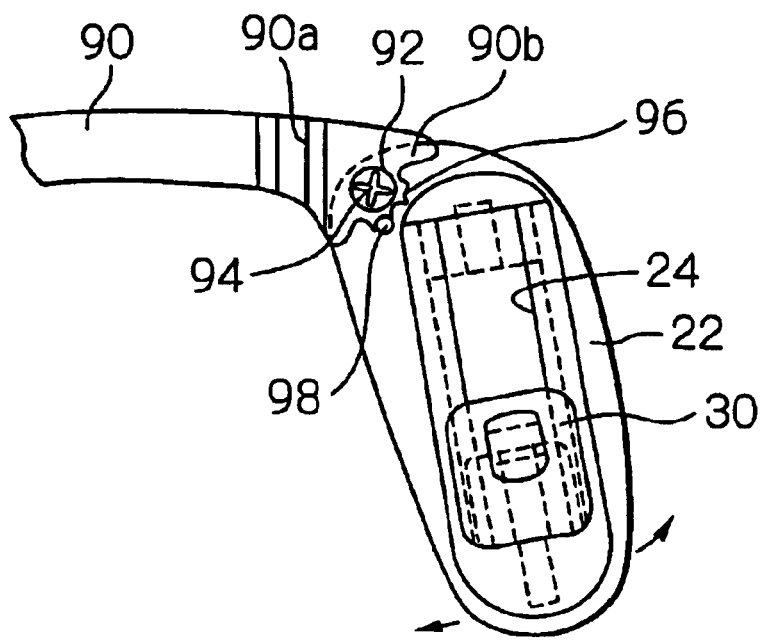

Referring to FIG. 10, a discrete thin bridge member 90 extends between the two nose pads 22, 22 (only one is shown) and has curved regions 90a, 90a (only one is shown). The bridge member 90 has opposite enlarged ends 90b, 90b (only one is shown). A through opening 92 is defined in each enlarged end 90b of the bridge member 90. The nose pad 22 is formed at its upper end with a blind hole (not shown). A screw 94 is threaded through the opening 92 and into the blind hole to secure the bridge member 90 to the nose pad 22. In this embodiment, the enlarged end 90b of the bridge member 90 is somewhat in the form of a gear and has a series of recesses 96 (three are shown). A pin 98 extends horizontally from the front side of the nose pad 22. The pin 98 is selectively engageable with the recesses 96 to incrementally adjust the angular position of the nose pad 22 relative to the bridge member 90 as shown by the arrows in FIG. 10.

Figure 11:
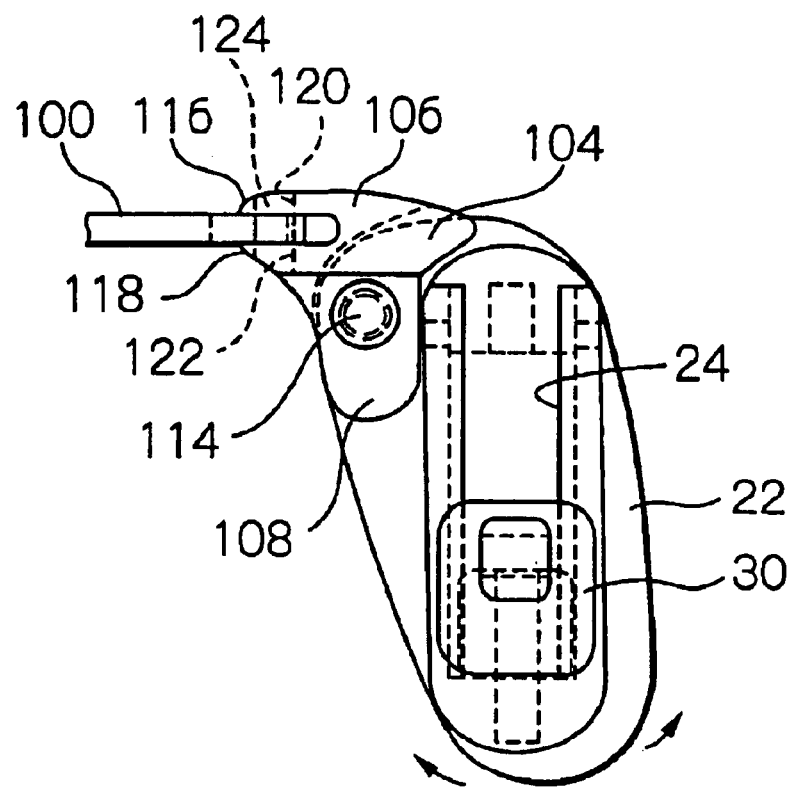
FIG. 11 is a partial front view of a still alternative form of the nose pad assembly according to the present invention.
Figure 12:
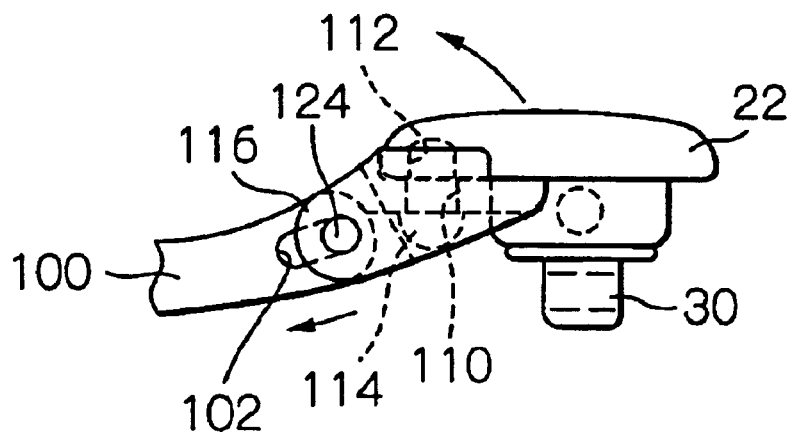
FIG. 12 is a partial top plan view of the nose pad assembly shown in FIG. 11.

FIGS. 11 and 12 show another embodiment of the nose pad assembly according to the present invention. In this embodiment, a discrete bridge member 100 horizontally extends between the nose pads 22, 22 (only one is shown in FIGS. 11 and 12). The bridge member 100 has an arcuate shape when viewed in plan as shown in FIG. 12. The bridge member 100 is formed at each end with an elongated slot 102. A substantially T-shaped holder 104 includes a head 106, and a leg 108 extending downwardly from the head 106 and having a through opening 110. The nose pad 22 is formed at its upper end with a blind hole 112. After the leg 108 is placed in contact with the front side of the nose pad 22, a horizontal pin 114 is passed through the opening 110 and press fit into the blind hole 112 to secure the holder 104 to the upper end of the nose pad 22. The angular position of the nose pad 22 can be changed by rotating the nose pad 22 about the pin 114, as shown by the arrows in FIG. 11. The head 106 is bifurcated at its one end to provide upper and lower tongues 116, 118. A space exists between the upper and lower tongues 116, 118. The upper and lower tongues 116, 118 are formed with respective apertures 120, 122. The apertures 120, 122 are vertically aligned with each other. A vertical pin 124 is inserted through the aperture 120 and the slot 102 and into the aperture 122 to hold one end of the bridge member 100 in place. The distance between the two nose pads 22, 22 can be changed by moving the pin 124 along the elongated slot 102. In this embodiment, the bridge member 100 is free to rotate about the pin 124 on a substantially horizontal plane. In other words, the bridge member 100 allows the nose pads 22, 22 to be adjusted to the contour of the nose of a wear at the time the eyeglass frame 10 is fitted. The bridge member 100 is made of a sufficiently rigid plastic material so that the bridge member 100 can resist a vertical force which may be exerted on the bridge member 100 when the eyeglass frame 10 is moved between its upper and lower positions. The bridge member 100 may alternatively be made of metal.

While the preferred embodiments of the present invention have been described, it is not intended to be exhaustive or to limit the invention to the precise form disclosed. Many variations and modifications may be made without departing from the scope and sprit of the invention as defined by the appended claims.

What is claimed is:

1. A nose pad assembly adapted for use in an eyeglass frame having a pair of lens supporting members adapted to hold a corresponding pair of multifocal lenses, and a corresponding pair of pad arms extending from said pair of respective lens supporting members, said eyeglass frame being moved between upper and lower positions, said nose pad assembly comprising:
   a pair of nose pads having upper and lower ends;
   means operatively associated with said pair of nose pads for holding the eyeglass frame in its upper and lower positions; and
   a bridge member extending between said pair of nose pads, said bridge member being configured to resist a substantially vertical force while being free to flex in a substantially horizontal direction.

2. A nose pad assembly according to claim 1, wherein said pair of nose pads include respective elongated guide grooves extending between the upper and lower ends of said nose pads, and said means includes a corresponding pair of first magnets fixedly mounted in the upper end of said nose pads, a corresponding pair of second magnets fixedly mounted in the lower end of said nose pads, and a corresponding pair of slides slidably moved along said guide grooves of said nose pads and adapted to be detachably secured to the respective pad arms, said pair of slides including a corresponding pair of third magnets positioned within said respective guide grooves and selectively attached to said first and second magnets to hold the eyeglass frame in its upper and lower positions, respectively.

3. A nose pad assembly according to claim 1, wherein said bridge member is elongated in a horizontal direction and oriented in an upright position between said nose pads.

4. A nose pad assembly according to claim 1, wherein said bridge member has a horizontally arcuate shape.

5. A nose pad assembly according to claim 1, wherein said bridge member has opposite curved ends connected to said pair of nose pads.

6. A nose pad assembly according to claim 5, wherein said curved ends of said bridge member have a S-shape.

7. A nose pad assembly according to claim 1, wherein said nose pads and said bridge member are of a one-piece construction.

8. A nose pad assembly according to claim 1, wherein said bridge member is a discrete piece and has opposite ends secured to said nose pads by respective horizontal pins.

9. A nose pad assembly according to claim 8, wherein said bridge member has at each end an elongated slot to adjustably receive each of said horizontal pins.

10. A nose pad assembly according to claim 8, wherein said bridge member includes at least one stopper adjacent to each end, said at least one stopper being engageable with the upper end of said nose pad to limit the range of angular movement of said nose pad about said horizontal pin.

11. A nose pad assembly according to claim 8, wherein said bridge-member has a plurality of recesses at each end, and each of said nose pads includes a horizontal pin engageable with said recesses to incrementally adjust angular position of said nose pad.

12. A nose pad assembly according to claim 1, wherein a corresponding pair of holders secured to said pair of nose pads, said pair of holders being configured to support said bridge member so that said bridge member is rotatable in a substantially horizontal plane, said bridge member being made of a sufficiently rigid material.

13. A nose pad assembly suitable for an eyeglass frame with multifocal lenses, said nose pad assembly comprising:

a pair of nose pads having upper and lower ends, said pair of nose pads including respective elongated guide grooves extending between the upper and lower ends of said nose pads;

a corresponding pair of upper magnets mounted in said upper end of said pair of nose pads;

a corresponding pair of lower magnets mounted in said lower end of said pair of nose pads;

a corresponding pair of slides slidably moved along said guide grooves of said nose pads and adapted to be detachably secured to a corresponding pair of pad arms of the eyeglass frame, said pair of slides including a corresponding pair of slide magnets positioned within said respective guide grooves and selectively attached to said upper and lower magnets to hold the eyeglass frame in its upper and lower positions, respectively; and a bridge member extending between said pair of nose pads, said bridge member being oriented to resist a substantially vertical force while being free to flex in a substantially horizontal direction.

14. A nose pad assembly according to claim 13, wherein said bridge member has a horizontally arcuate shape.

15. A nose pad assembly according to claim 13, wherein said bridge member has opposite curved ends connected to said pair of nose pads.

16. A nose pad assembly according to claim 13, wherein said curved ends of said bridge member have a S-shape.

17. A nose pad assembly according to claim 13, wherein said bridge member is elongated in a horizontal direction and oriented in an upright position between said nose pads.

* * * * *